Figure 1:
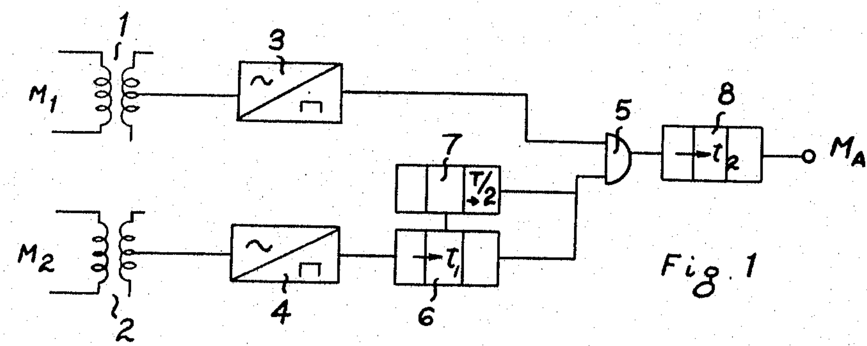

June 13, 1967 H. UNGRAD 3,325,687

ELECTRONIC DIRECTIONAL RELAY WITH VARIABLE RANGE OF RELEASES

Filed May 18, 1964 2 Sheets-Sheet 1

INVENTOR.
Helmut Ungrad
BY
Pierce Scheffler & Parker
Attorneys

ELECTRONIC DIRECTIONAL RELAY WITH VARIABLE RANGE OF RELEASES

Filed May 18, 1964 2 Sheets-Sheet 2

$\varphi_{12} = 60°$ $\alpha_1 = -60°$ $\alpha_2 = 155°$ $\varphi_{12} = 30°$

INVENTOR.
Helmut Ungrad
BY
Pierce Scheffler & Parker
Attorneys

United States Patent Office 3,325,687 Patented June 13, 1967

3,325,687

ELECTRONIC DIRECTIONAL RELAY WITH VARIABLE RANGE OF RELEASES

Helmut Ungrad, Neuenhof, Switzerland, assignor to Aktiengesellschaft Brown, Boveri & Cie., Baden, Switzerland, a joint-stock company Filed May 18, 1964, Ser. No. 367,959
Claims priority, application Switzerland, June 28, 1963, 8,058/63
2 Claims. (Cl. 317—36)

The present invention concerns a directional relay which makes the supplied measuring quantities rectangular by electronic means and which determines by coincidence the angle between the measuring quantities, a signal being transmitted when the measuring quantities coincide, while a blocking order is issued in case of non-coincidence.

In directional relays, two measuring quantities are associated with each other, on whose mutual phase displacement it depends whether the directional relay trips or blocks. In electromechanical relays Ferraris disks have been used whose direction of rotation indicates the direction. These relays are so wired that they issue a release order, for example, from an angle of one measuring quantity leading by 90° to an angle trailing by 90° while they block at the other angles. Such a relay thus covers a range of 180° where it trips, whereas it blocks in the other 180° out of a total of 360°. In these relays it is possible to turn this range by varying the internal phase shift. One can thus obtain, for example, a range of from 0° to 180° in which the relay trips. This range in which the relay trips or blocks is called the measuring position of the respective relay.

In a similar manner, work relays in a bridge rectifier connection to which is fed, on the one hand, the sum of and, on the other hand, the difference between the two measuring quantities. They too cover a range from—90° to +90°.

It has also been suggested to compare the two measuring quantities with electronic means where one measuring quantity is transformed, for example, into a rectangular wave, the other measuring quantity into an impulse. If the rectangular measuring quantity and the impulse have, at the same time, the same direction, the relay will trip; if the impulse and the rectangular wave do not coincide, the relay blocks. By means of this method it is possible to effect the tripping or blocking from a certain phase position. Depending on the position of the impulse, the measuring position can be changed here too, but the fact remains that in a range of 180° the relay either trips or blocks.

Up to now one therefore had in these embodiments directional relays with a range of 180°, where this range could be shifted in any desired manner.

The problem is now not only to turn to the range but also to influence the width of the range. This was not possible with the conventional models.

According to the present invention a directional relay is therefore proposed which is characterized by the fact that time tippers are provided which at least delay one signal in such a way that the range of the relay in which it transmits a signal can be predetermined.

An example of such an arrangement is represented schematically in FIG. 1. The method of operation is shown in FIGS. 2 to 6.

With reference now to FIG. 1, the measuring quantities designated $M_1$ and $M_2$, which can be either voltage and current, or two voltages, or two currents, are fed from voltage- or current-transformers, which are not represented, to intermediate transformers 1 and 2. The secondary circuits of these intermediate transformers are represented as single-phase. The measuring quantity then passes over into a transforming device 3 and 4, which transform the sinusoidal form of the measuring quantity into a rectangular form. The measuring quantity $M_1$ then enters directly the AND-member 5. The measuring quantity $M_2$, however, is fed over two time tippers 6 and 7 to the AND-member. The time tippers have here the following characteristic; time tipper 6 has the input delay $t_1$, that is, the input signal cannot act immediately, but only after a time $t_1$. The time member 7, however, has an output delay, that is, when the signal has stopped, it still remains for a certain time, for example, $T/2$. T denotes here the cycle of a sine wave. The time tipper 7 delays thus the output by half a cycle. Then the measuring quantity $M_2$ is likewise fed to the AND-member 5. The AND-member 5 transmits only a signal when both measuring quantities $M_1$ and $M_2$ are fed at the same time. The resulting output signal passes then over the time tipper 8, which has again an input delay $t_2$. Its output signal is designated with $M_a$. This output signal means tripping for the directional relay; if there is no output signal, the system blocks.

Figure 2:
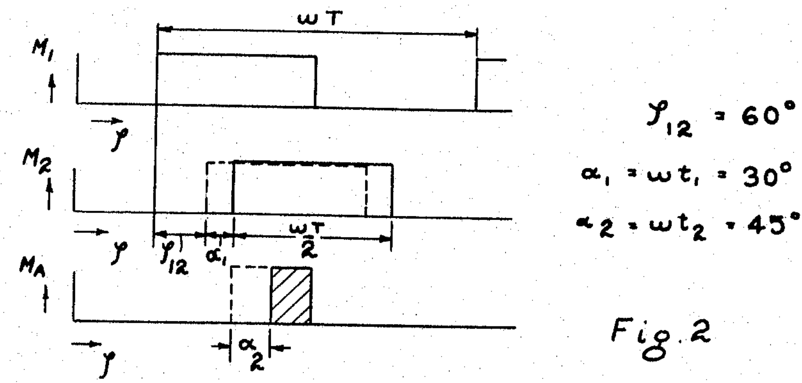
Figure 3:
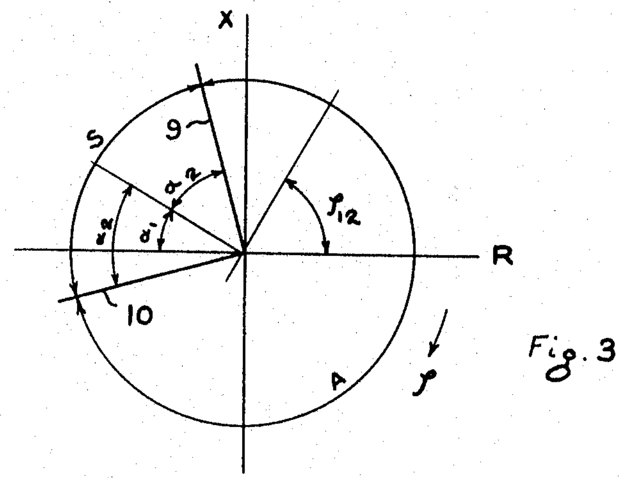

With this system one can obtain a circuit where the range of blocking and tripping can be shaped in any desired manner. This can be seen from FIGS. 2 to 6. FIG. 2 shows the signals $M_1$ and $M_2$ transformed into a rectangular form, as well as the resulting output signal. In the example, the delay time $t_1$ is so selected that a phase shift $\alpha_1=30°$ results. Besides, the time tipper 8 has a delay which corresponds to an angle $\alpha_2=45°$. If one assumes further that the actual phase angle between the measuring quantities $M_1$ and $M_2$ is 60° ($\varphi_{12}$), one has a method of operation as it is represented in FIG. 2. The signal $M_1$ is not changed, it has thus its original phase position which is only transformed into the rectangular form. The signal $M_2$ is in itself displaced by the angle $\varphi_{12}$ and should therefore have a phase position which corresponds to the original broken rectangular form. But since the time tipper 6 now delays the input, namely, by the time $t_1$, that is, by the angle $\alpha_1$ an output signal is first formed there which corresponds to the solid rectangular form. Since the time tipper 7 is started at the same time, this output signal runs for half a cycle $T/2$, corresponding to this time tipper, and has thus the same width as the original signal. One then sees that an overlapping time is now formed, which originates at the output of the AND-member and which would correspond to the broken form of the output signal $M_a$. But since the latter is again delayed by the angle $\alpha_2$ in the time tipper 8, an output signal of the hatched width is formed. In this case one thus has tripping. If one calculates this for several angles, one obtains a diagram as represented in FIG. 3. This diagram is represented in the form of a so-called RX-diagram, that is, the horizontal axis is the resistance axis, the vertical axis the reactance axis. The actual phase angle between the two measuring quantities is designated here with $\varphi_{12}$. The tripping range A is limited by the lines 9 and 10. It is thus substantially wider than 180° and covers exactly a range from −165° to +105°. The rest is blocking range, which is designated with S. One can also see from this diagram that the center position of the ranges is determined by the angle $\alpha_1$, which is displaced with regard to the R–A axis by exactly $\alpha_1=30°$. The width of the range, namely, of the blocking range, is determined by the angle 45°; it is thus altogether 90°. In the example of FIG. 2, the angle $\varphi_{12}$ lies in the tripping range, as it can be seen. If this angle exceeds now the value of 105° the entire system is brought into blocking direction. Since $\varphi_{12}$ is opposite to the assumed direction of rotation of the general angle $\varphi$, the measuring quantity $M_1$ is trailing with regard to the measuring quantity $M_2$.

Figure 4:
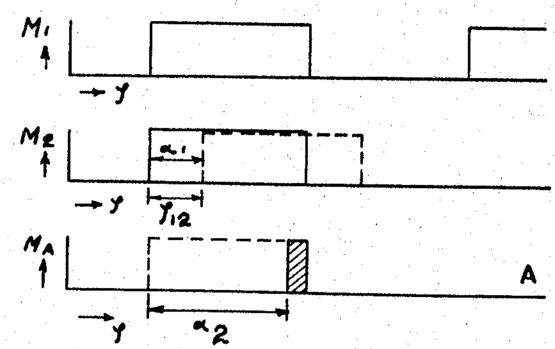
Figure 5:
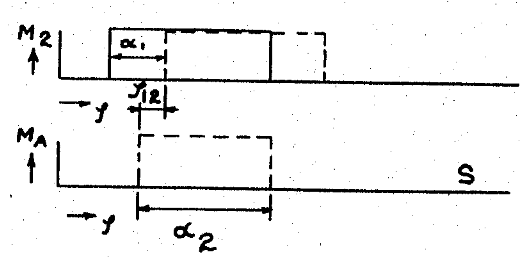
Figure 6:
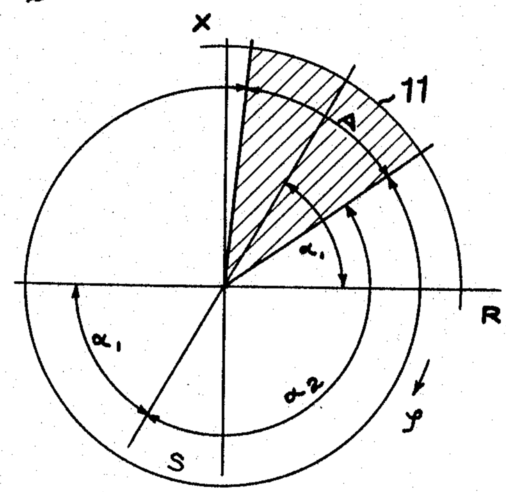

FIGS. 4 to 6 show a different setting, which has only a small tripping width and a large blocking range. $\alpha_1$ is now directed to the opposite side; it is designated with $-60°$. $\alpha_2$ has a value of 155°. In FIG. 4 is now assumed a phase angle of the two measuring quantities $\varphi_{12}$ of 60°, in FIG. 5 of 30°. In the top diagram is again plotted the measuring quantity $M_1$, which has remained unchanged. The measuring quantity $M_2$ trails the measuring quantity $M_1$ in the first example by $\varphi_{12}=60°$. This is the position indicated by the broken line. $\alpha_1$ is negative, however, in this case, that is, the signal is made leading. Actually, this means naturally a time delay of 300°. The measuring quantity thus moves into the position of the solid line, that is, in this case $M_1$ and $M_2$ coincide in time completely. This would result in an output signal behind the AND-member 5 of the broken form. But since $\alpha_2$ causes a delay of 155°, the actual overlapping time is only the region of the hatched area, hence, relatively small. But there is a tripping signal which is again designated with A.

The situation is different if the phase displacement between the two measuring quantities is only 30. FIG. 5 shows the measuring quantity $M_2$ and the output signal $M_a$. The measuring quantity $M_1$ has the same position as in FIG. 4. The broken form of the measuring quantity $M_2$ is now displaced by the angle $\varphi_{12}=30°$, but the solid line is displaced to the left by $\alpha_1$. An overlapping region would thus be formed which corresponds to the broken line of the output signal $M_a$. But since the delay $\alpha_2=155°$, the latter is greater than the width of the output signal, which is only 150°. Consequently, no output signal can be formed and the entire system blocks. This is indicated with S in FIG. 5. The limit of the tripping region with the indicated data is thus between $-35°$ and $-85°$. The rotation by the angle $\alpha_1$ is 60° and the width of the tripping ranges $\pm25$.

With this arrangement it is thus possible to obtain any desired measuring position where not only the center of the measuring position is turned, but the entire range can be widened or reduced. The advantage of such an arrangement can be seen particularly when it is used as an impedance guard. As known, impedance relays are combined with directional relays in order to obtain a directed impedance guard. Impedance relays trip when the impedance drops below a certain value. This can be represented by the impedance line, the impedance circle in the RX diagram. The latter is indicated with 11 in FIG. 6. One can seen the following from the diagram:

The normal operating current has a phase displacement of about 0 to 30°. With this phase displacement, the directional relay blocks with the selected setting. One can thus provide any desired operating impedance without the risk that the impedance guard will trip. This is not possible with the presently known methods, because with a range of 180° at least the range of $\pm90°$ had to be set to ensure the correct operation of the impedance guard in case of errors. In case of errors, the phase angle is about 90°, as known. Formerly, it was therefore not posible to set at will the impedance required by the relay as tripping value; it was rather necessary to take into consideration the operating impedance, that is, the impedance in normal operation. This led in weak load-short circuits under certain circumstances to tripping failures, since the relay measured in this case a too high impedance and therefore could not trip. But if a directional relay according to the present invention is used, the tripping impedance of the relay can be set at will, so that the relay becomes more sensitive without the risk that it will trip incorrectly in normal operation. The guard can therefore be released with safety in weak load-short circuits.

I claim:

1. A directional relay system responsive to two measured alternating current quantities displaced in phase which comprises means respectively converting the actual wave form of each said measured quantity into a corresponding wave having an essentially rectangular configuration, a coincidence circuit such as an AND gate having two inputs and an output, first circuit means connecting the rectangular wave corresponding to one of said measured quantities directly to one of the inputs of said coincidence circuit, second circuit means indirectly connecting the other of said measured quantities to the other input of said coincidence circuit through a time delay circuit, said time delay circuit comprising a first time tipper having an adjustable input delay and an output delay, and a time tipper having an input delay connected to the output of said coincidence circuit and which produces an output signal for tripping the directional relay.

2. A directional relay system as defined in claim 1 wherein the output delay of said first time tipper amounts to a half-period of the wave of said measured quantities.

References Cited

UNITED STATES PATENTS 3,163,802 12/1964 Seguin et al. -------- 317—36

MILTON O. HIRSHFIELD, *Primary Examiner.*

R. V. LUPO, *Assistant Examiner.*